United States Patent
Griggs et al.

(10) Patent No.: US 12,084,877 B2
(45) Date of Patent: Sep. 10, 2024

(54) TUBULAR BURIAL APPARATUS FOR CREMATION AND/OR VALUABLES

(71) Applicant: Genesis Burial Solutions, LLC, Copley, OH (US)

(72) Inventors: Rodney L. Griggs, Copley, OH (US); Tracey L. Griggs, Copley, OH (US)

(73) Assignee: Genesis Burial Solutions, LLC

(*) Notice: Subject to any disclaimer, the term of this patent is extended or adjusted under 35 U.S.C. 154(b) by 140 days.

(21) Appl. No.: 17/658,043

(22) Filed: Apr. 5, 2022

(65) Prior Publication Data

US 2022/0316229 A1    Oct. 6, 2022

Related U.S. Application Data

(60) Provisional application No. 63/171,128, filed on Apr. 6, 2021.

(51) Int. Cl.
| | |
|---|---|
| *E04H 13/00* | (2006.01) |
| *A61G 17/08* | (2006.01) |
| *G06K 19/06* | (2006.01) |

(52) U.S. Cl.
CPC .......... *E04H 13/008* (2013.01); *A61G 17/08* (2013.01); *E04H 13/003* (2013.01); *G06K 19/06037* (2013.01)

(58) Field of Classification Search
CPC ..... E04H 13/008; E04H 13/003; A61G 17/08; A61G 2205/10; G06K 19/06037
USPC .............................................................. 27/1
See application file for complete search history.

(56) References Cited

U.S. PATENT DOCUMENTS

| | | | |
|---|---|---|---|
| 3,529,730 A | | 9/1970 | Thompson |
| 3,726,052 A | * | 4/1973 | Thompson ............ E04H 13/003 52/27 |
| 5,553,426 A | * | 9/1996 | Ostergaard ............ E04H 13/003 52/103 |
| 5,564,816 A | * | 10/1996 | Arcadia ................. A47G 33/02 362/802 |
| 5,647,108 A | * | 7/1997 | Crook .................... E04H 13/006 27/DIG. 1 |
| 6,463,703 B1 | * | 10/2002 | Mattis ................... E04H 13/003 52/103 |
| 6,904,721 B1 | * | 6/2005 | Forbes .................. E04H 13/008 52/103 |
| 6,925,740 B2 | * | 8/2005 | Shannon ................. G09F 19/00 52/103 |
| 7,036,195 B2 | | 5/2006 | Glass |

(Continued)

FOREIGN PATENT DOCUMENTS

| | | |
|---|---|---|
| CA | 2495211 C | 3/2004 |
| EP | 3106588 A2 | 12/2016 |
| WO | WO2004018294 A2 | 3/2004 |

*Primary Examiner* — William L Miller
(74) *Attorney, Agent, or Firm* — Emerson Thomson Bennett; Daniel A. Thomson

(57) ABSTRACT

A burial system is disclosed herein including at least one container, wherein the at least one container has a container body, a container body top, a container body bottom, and a cap assembly, at least one stake connected to the at least one container, wherein the at least one stake has a stake shaft, a stake head, and a stake tip, wherein the stake head is connected to the container body bottom, at least one side stabilizer, wherein the at least one side stabilizer is connected to the outside of the container body, and a location identifier.

19 Claims, 7 Drawing Sheets

(56) References Cited

U.S. PATENT DOCUMENTS

| | | | |
|---|---|---|---|
| 7,406,754 B2 * | 8/2008 | Trail | E04H 13/008 52/103 |
| 7,478,461 B2 | 1/2009 | Glass | |
| 7,703,185 B2 * | 4/2010 | Trail | E04H 13/003 52/103 |
| 7,739,776 B2 | 6/2010 | Hume | |
| 7,937,814 B2 | 5/2011 | Voit | |
| 8,209,918 B1 | 7/2012 | Voit | |
| D711,064 S * | 8/2014 | Miller | A61G 17/08 D99/18 |
| 8,943,762 B2 * | 2/2015 | Carlson | E04H 13/008 27/DIG. 1 |
| 8,966,725 B2 * | 3/2015 | Langelier | A61G 99/00 27/35 |
| 9,290,960 B1 * | 3/2016 | McHale | E04H 13/00 |
| 9,441,393 B1 * | 9/2016 | Muthusami | E04H 13/001 |
| 9,465,812 B1 | 10/2016 | Robinson et al. | |
| 10,223,559 B1 * | 3/2019 | Chen | G06Q 30/0281 |
| 11,464,699 B1 * | 10/2022 | Muthusami | B65D 53/02 |
| 11,976,486 B1 * | 5/2024 | McElroy, Jr. | E04H 13/006 |
| 2007/0130736 A1 | 6/2007 | Trail | |
| 2008/0034648 A1 * | 2/2008 | Rasmussen | E04H 13/003 47/41.1 |
| 2008/0083102 A1 * | 4/2008 | Johnson | E04H 13/008 27/1 |
| 2008/0229679 A1 | 9/2008 | Trail | |
| 2013/0185907 A1 * | 7/2013 | Langelier | A61G 17/08 27/1 |
| 2014/0218519 A1 * | 8/2014 | Borovinov | H04N 23/00 27/1 |
| 2017/0109621 A1 * | 4/2017 | Brown | E04H 13/003 |
| 2023/0003048 A1 * | 1/2023 | Garcia | E04H 13/008 |
| 2024/0028852 A1 * | 1/2024 | Blackshear | G06K 19/06037 |

\* cited by examiner

TUBULAR BURIAL APPARATUS FOR CREMATION AND/OR VALUABLES

This non-provisional application claims priority to U.S. Provisional Patent Application Ser. No. 63/171,128, filed on Apr. 6, 2021.

I. BACKGROUND

The present subject matter is directed to a method and apparatus for more efficient burial. More specifically, the present technology is directed to facilitating more efficient, customizable, and environmentally friendly burial procedures.

Cremation is a method of final disposition of a dead body through burning (combustion). Cremation leaves behind an average of 2.4 kg (5.3 lbs) of remains, known as "ashes" or "cremains." This is not actual ash but unburnt fragments of bone mineral, which are commonly ground down into powder. They do not constitute a health risk and may be buried, interred in a memorial site, retained by relatives, or scattered in various ways. The cremation occurs in a cremator, which is located at a crematorium or crematory. In many countries, the crematorium is a venue for funerals as well as cremation. A cremator is an industrial furnace that is able to generate temperatures of 871-982° C. (1,600-1,800° F.) to ensure the disintegration of the corpse. Modern cremator fuels include oil, natural gas, propane, and coal gas. Modern cremators automatically monitor their interior to tell when the cremation process is complete and have a spyhole so that an operator can see inside. The time required for cremation varies from body to body, with the average being 90 minutes for an adult body.

The body is required to be inside a coffin or a combustible container. This allows the body to be quickly and safely slid into the cremator. It also reduces health risks to the operators. The coffin or container is inserted (charged) into the cremator as quickly as possible to avoid heat loss. Some crematoria allow relatives to view the charging. In the United States, federal law does not dictate any container requirements for cremation. Certain states, however, may require an opaque or non-transparent container for all cremations. This can be a simple corrugated-cardboard box or a wooden casket (coffin). Most casket manufacturers provide lines of caskets that are specially built for cremation. Another option is a cardboard box that fits inside a wooden shell, which is designed to look like a traditional casket. After the funeral service, the box is removed from the shell before cremation, permitting the shell to be re-used. Funeral homes may also offer rental caskets, which are traditional caskets used only during the services, after which the bodies are transferred to other containers for cremation. Rental caskets are sometimes designed with removable beds and liners, which are replaced after each use. After the incineration is completed, the dry bone fragments are swept out of the retort and pulverized by a machine called a Cremulator—essentially a high-capacity, high-speed blender—to process them into "ashes" or "cremated remains," although pulverization may also be performed by hand. This leaves the bone with a fine sand like texture and color, able to be scattered without need for mixing with any foreign matter, though the size of the grain varies depending on the Cremulator used. The grinding process typically takes about 20 seconds. The ash remaining represents very roughly 3.5% of the body's original mass (2.5% in children). Because the weight of dry bone fragments is so closely connected to skeletal mass, their weight varies greatly from person to person. Because many changes in body composition (such as fat and muscle loss or gain) do not affect the weight of cremated remains, the weight of the remains can be more closely predicted from the person's height and sex (which predicts skeletal weight), than it can be predicted from the person's simple weight.

Cremated remains are returned to the next of kin in different manners according to custom and country. In the United States, the cremated remains are almost always contained in a thick watertight polyethylene plastic bag contained within a hard snap-top rectangular plastic container, which is labeled with a printed paper label. The basic sealed plastic container bag may be contained within a further cardboard box or velvet sack, or they may be contained within an urn if the family had already purchased one. An official certificate of cremation prepared under the authority of the crematorium accompanies the remains, and if required by law, the permit for disposition of human remains, which must remain with the cremated remains. Cremated remains can be kept in an urn, stored in a special memorial building (columbarium), buried in the ground at many locations or sprinkled on a special field, mountain, or in the sea.

Despite being an obvious source of carbon emissions, cremation has environmental advantages over burial, depending on local practice. Studies have found that cremation has less of an environmental impact than a traditional burial (the study did not address natural burials), while the newer method of alkaline hydrolysis (sometimes called green cremation or resomation) had less impact than both. Some funeral and crematorium owners offer a carbon neutral funeral service incorporating efficient-burning coffins made from lightweight recycled composite board.

With the world population continuing to grow at a rapid rate, the need for burial sites will continue to increase. The availability of land for standard burials is becoming scarcer. This problem will only increase as the years go by. There is a need to develop new and better ways to inter loved ones, combining environmental impact, space issues, while also being sensitive to family members.

II. SUMMARY

It is desirable to provide a system to further promote cremation for burial.

The present teaching provides a system to allow multiple members of a family to be buried together, even if the dates of death are separated in time.

The present teaching provides a system for reducing the amount of land needed for burials, reducing the carbon footprint of burials, eliminating the need for wood, and reducing the amount of embalming chemicals needed for the burial process.

Still other benefits and advantages of the present subject matter will become apparent to those skilled in the art to which it pertains upon a reading and understanding of the following detailed specification.

III. BRIEF DESCRIPTION OF THE DRAWINGS

The present teachings are described hereinafter with reference to the accompanying drawings.

FIG. 1 shows a plan view of the system;
FIG. 2 shows a side view of a tube;
FIG. 3 shows perspective view of a cap;
FIG. 4 shows a perspective view of a stake;
FIG. 5 shows a top view of a box with the tube in ground;

IV. DETAILED DESCRIPTION

Figure 1:
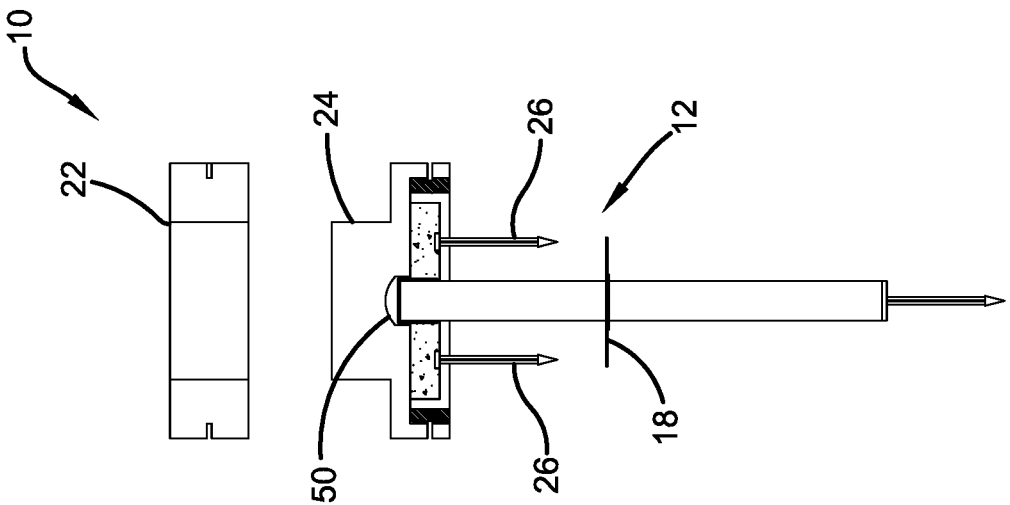
Figure 1:
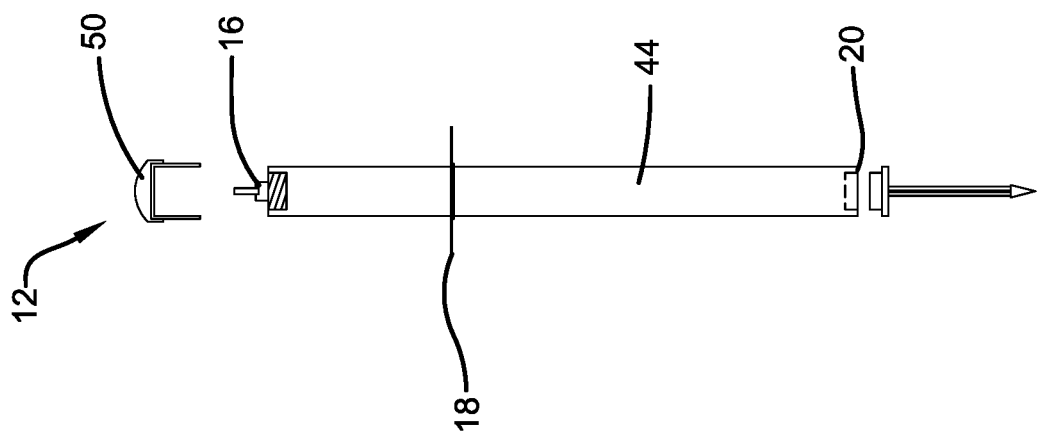
Figure 2:
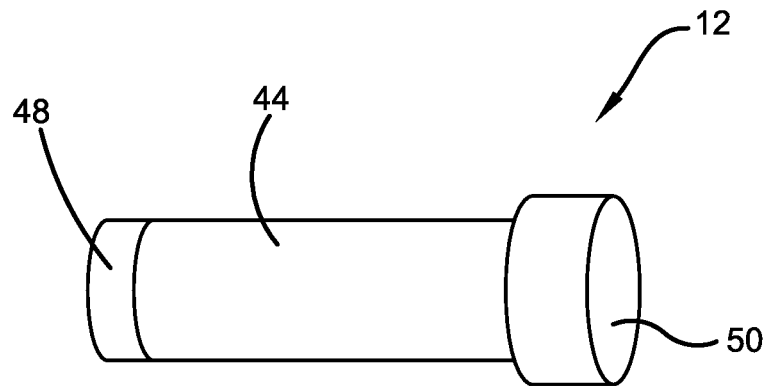
Figure 3:
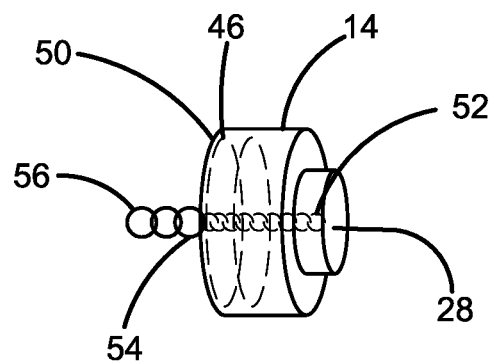
Figure 4:
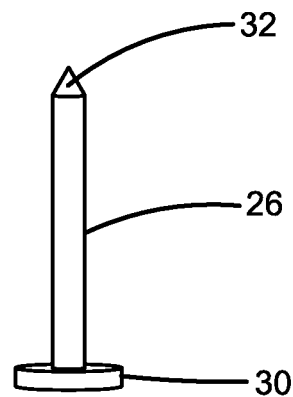
Figure 5:
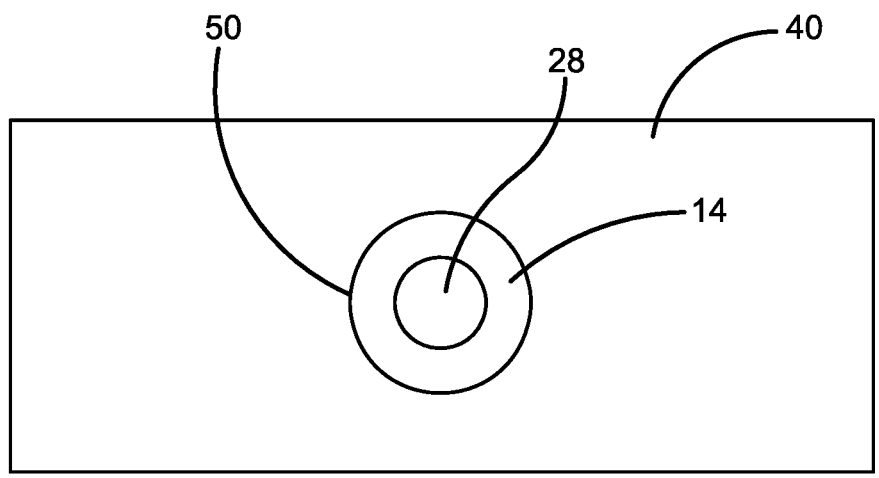
Figure 6:
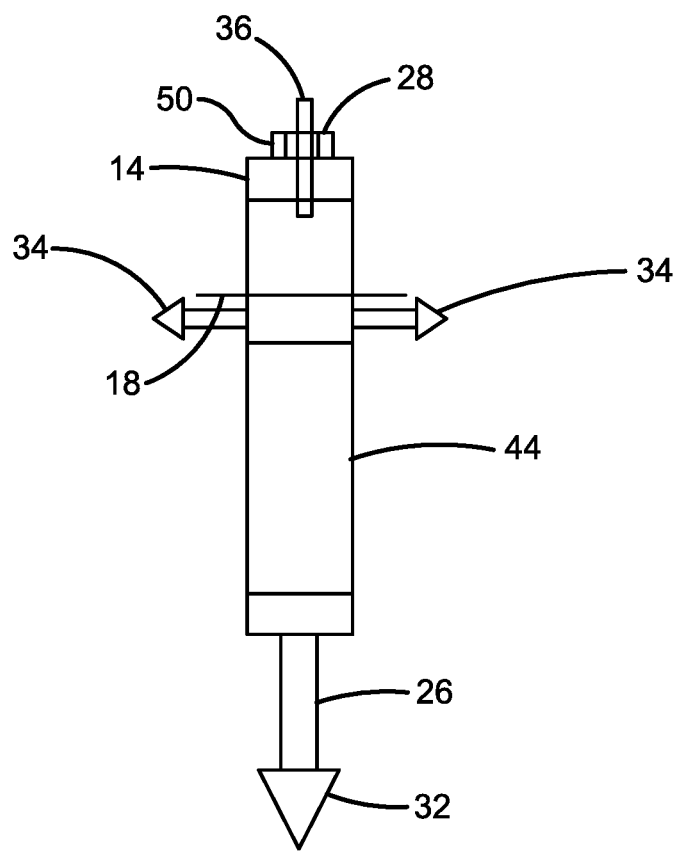
FIG. 6 shows a perspective view of another aspect of the tube.
Figure 7:
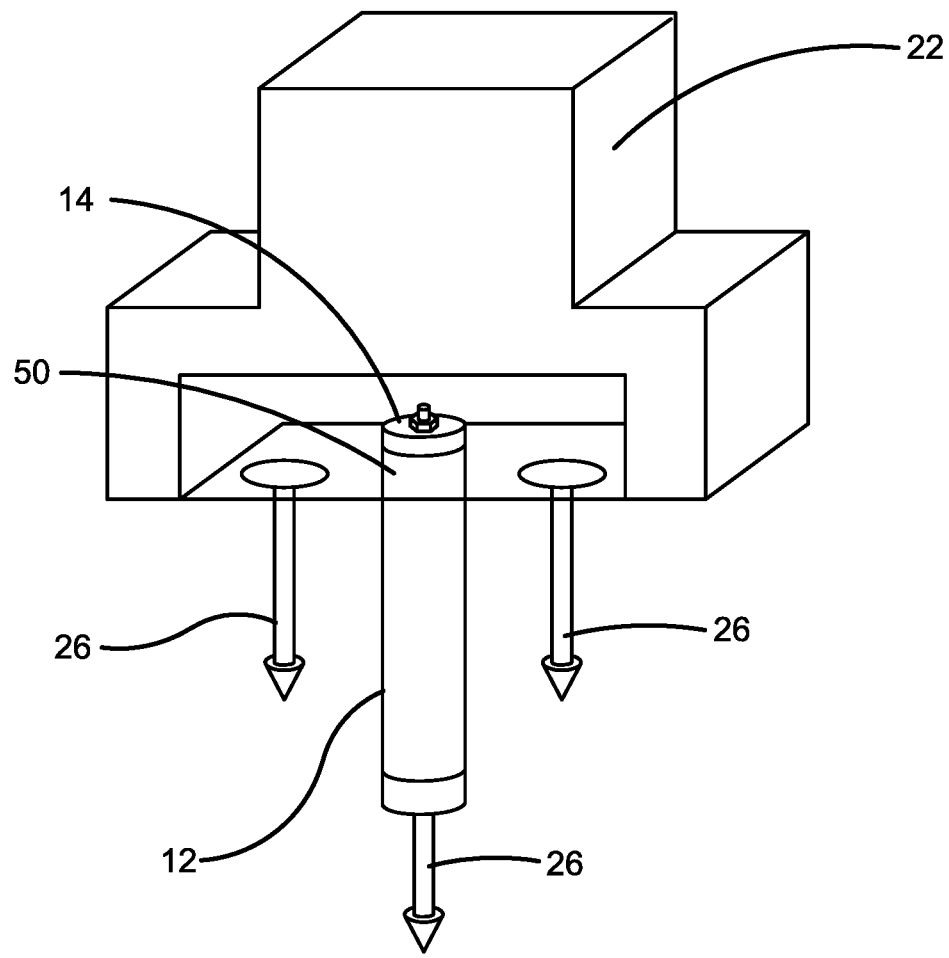
FIG. 7 shows a perspective view of a mounting base.

With reference now to FIGS. 1-8, a burial system 10 is disclosed, wherein the burial system 10 includes a container 12, a marker 22, an interior base 24, a secondary base 38, stakes 26, and a foundation base 40. The container 12 has a container body 44, cap assembly 50, cap 14, cap handle 28, container body top 16, container body bottom 20, and ring stabilizer 18. The cap 14 is attached to the container body top 16 via any means using sound engineering judgment. In one aspect of the present teachings, the cap 14 may be threaded 46, attaching to a matching threaded portion (not shown) on the container body top 16. The container body bottom 20 may have a stake 26 attached to it in order to more firmly hold the container 12 in the ground.

With continuing reference to FIGS. 1-8, the process begins with a burial plot (not shown). A three to five foot deep hole is dug in the ground using an auger (or any other type of equipment for digging holes), such that the container 12 can be placed in the ground. The container 12 is place in the hole, wherein a stake 26 can be attached to container body bottom 20 in order to hold the container 12 in place. In one aspect of the present teachings, the container 12 is made of a waterproof material. The remains are placed inside the remains container 42, and the remains container 42 is sealed. The remains container 42 is then lowered into the container 12. The container 12 may have a cushion 48 at the container body bottom 20 in order to prevent breakage of the remains container 42 when it is lowered or placed into the container 12. The container 12 can then be sealed with the cap assembly 50. The cap assembly 50 has the cap 14 and can have a cap handle 28 for ease of removal of the cap 14. In one aspect of the present teachings, the cap handle 28 (or the cap 14) has an opening 52 which can have a chain 54 connected via the opening 52. The opening 52 can also be used to lower the container 12 into the hole. The chain 54 has an attachment device 56 at the end to attach to the remains container 42. This allows for the remains container 42 to be lowered into a container 12 that is already in the ground, and then to re-attach the cap 14 to the container 12. The container 12 also has a location identifier 36, which in one aspect of the present teachings is connected to GPS, such that the location of a burial site can be easily located, either for visiting families, or if additional remains container 42 are being added. In one aspect of the present teachings, the location identifier 36 is at least partially above ground. In one aspect, the remains container 42 is an urn.

With continuing reference to FIGS. 1-8, the container 12 can even be buried with an existing casket, in an existing burial plot. In one aspect of the present teachings, the remains container 42 has information placed on it, such as the name of the deceased and the dates they were born and died. This information may be written on the remains container or can be accessible via a bar code or QR code. If a bar code or QR code is utilized, the information is stored electronically either on a local physical computing device, a remote physical computing device, or a virtual computing device. In one aspect of the present teachings, the container 12 is made of PVC pipe, which is two, four, or six inches in diameter, although the container 12 can be made of any size and made of any waterproof material. In one aspect of the present teachings, the container 12 has an eight inch or smaller diameter. In one aspect of the present teachings, the container 12 has a ring stabilizer 18, located roughly in the middle of the container 12 to provide stability to the container 12. The ring stabilizer 18 can have side stabilizers 34 on either side of the container 12, in order to provide lateral stability to the container 12. In one aspect of the present teachings, the side stabilizers 34 are retractable.

With continuing reference to FIGS. 1-8, the foundation base 40 can be placed in the hole, utilizing stakes 26, wherein the stakes 26 have a head 30 and a tip 32, with the top of the foundation base 40 being roughly at ground level 58. The foundation base 40 can be secured in place via the stakes 26 over top of an existing container 12. The foundation base 40 would have an opening through which the cap 14 of the container 12 is accessible. The foundation base 40 can be filled with cement or sand to hold the container 12 in place. On top of the foundation base 40, a secondary base 38 can be used as a cover for the foundation base 40. The secondary base 38 is attached to the foundation base 40 using waterproof bolts, which can be made of a hard plastic. Attached to the secondary base 38 is interior base 24, which can hold the marker 22. In order to access the container 12, the marker 22, interior base 24, and secondary base 38 are removed.

Figure 8:
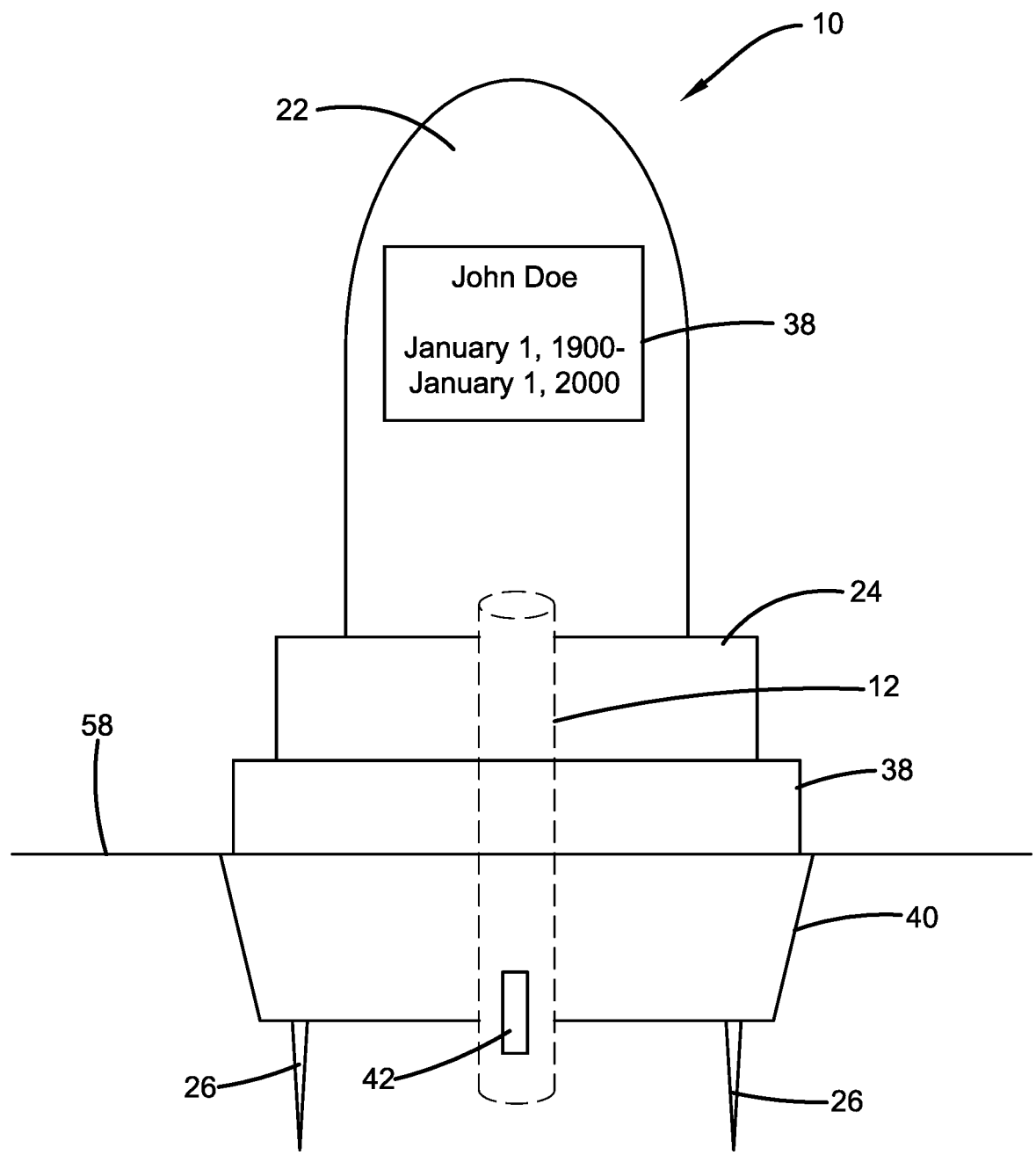
FIG. 8 shows a front view of the system with a headstone.
Figure 9:
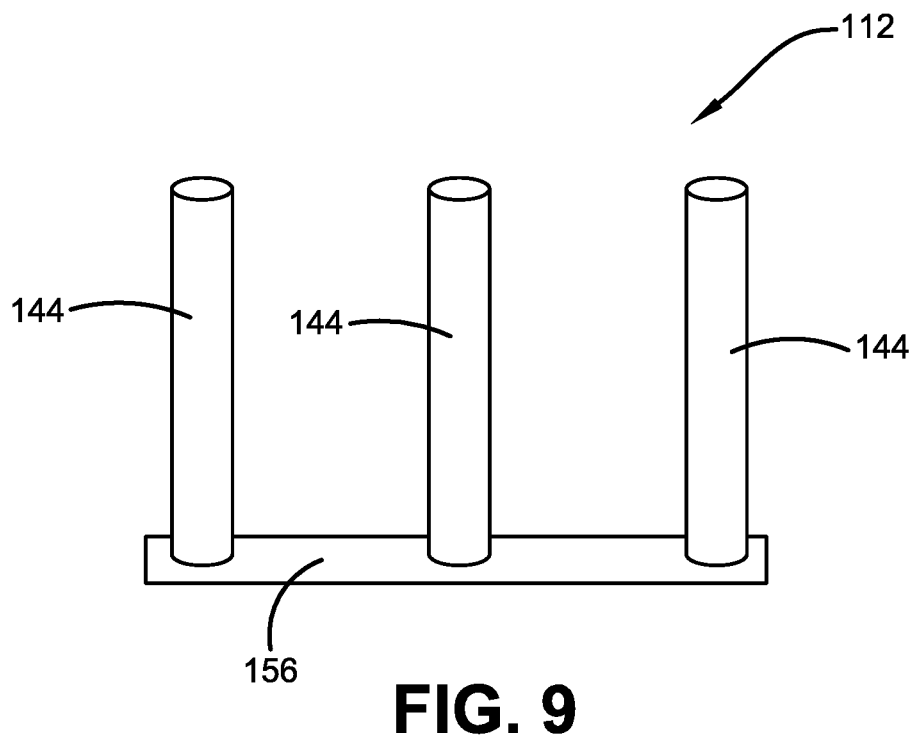
FIG. 9 shows a perspective view of multiple tubes.
Figure 10:
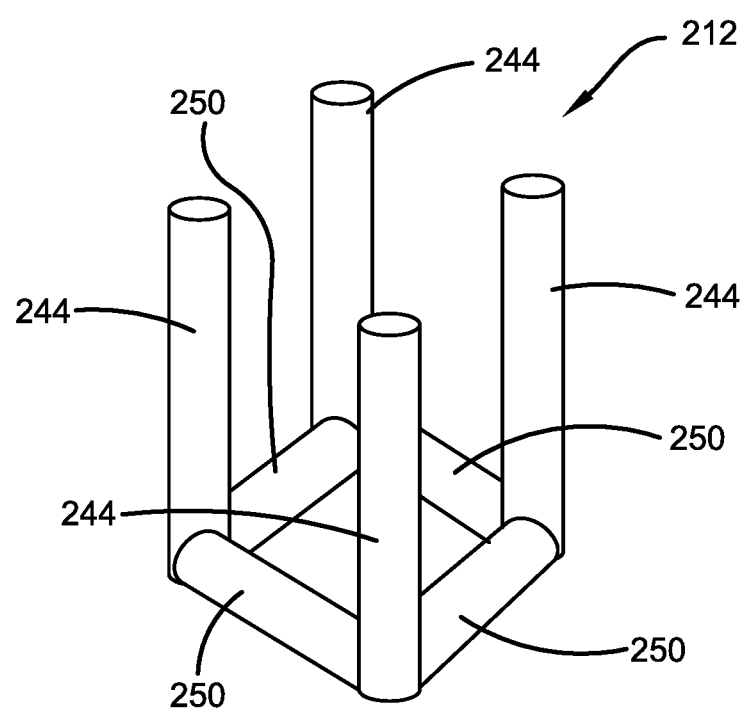
FIG. 10 shows a perspective view of another arrangement of multiple tubes.
Figure 11:
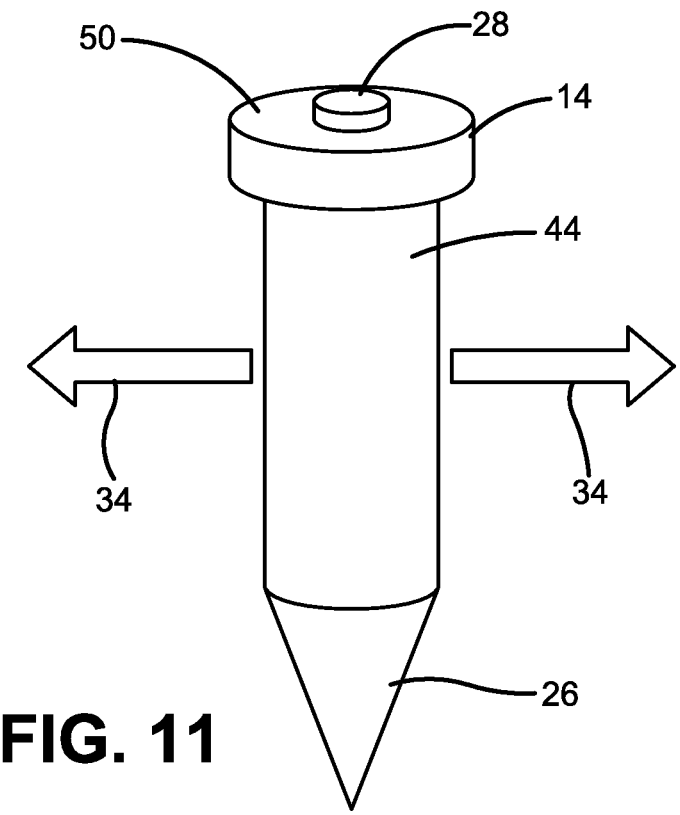
FIG. 11 shows a perspective view of a tube with side stakes.
Figure 12:
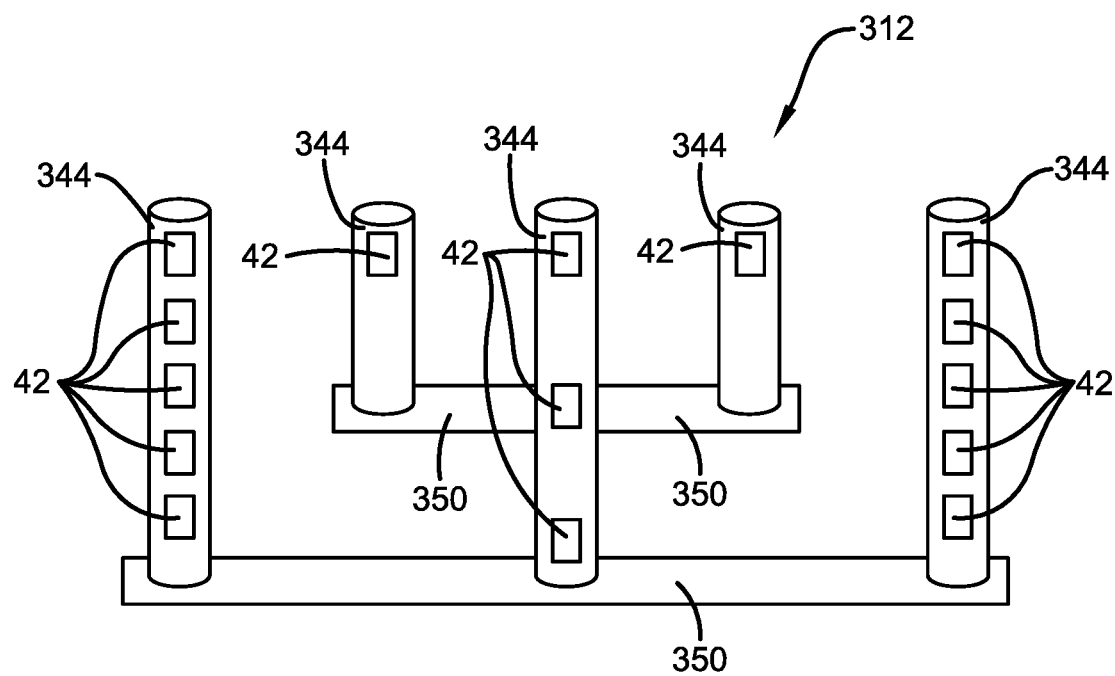
FIG. 12 shows a perspective view of the system with multiple members interred.

With reference to FIGS. 9-12, the burial system 10 can allow for multiple, simultaneous burials, or additional burials at a later date. As shown in FIG. 9, the containers 112 can consist of container bodies 144, connected with a base 150. As shown in FIG. 10, the containers 212 can consist of a different arrangement of container bodies 244, connected with connectors 250. And, as shown in FIG. 12, the containers 312 can be set up in a tree formation of container bodies 344, connected by connectors 350. Each container body 344 can house multiple remains containers 42. The container 312 allows for entire extended families to be buried in the same location. The burial system 10 also allows for adding additional containers 12, 112, 212, 312 to any of the arrangements. On top of each can be the same set up as shown in FIG. 8, with one marker 22 with multiple names, or multiple markers 22. The burial system 10 allows for ease of access to add additional remains containers 42. The burial system can allow for dozens or hundreds of remains containers 42 to be buried in a relatively small area. The marker 22 can be a traditional headstone or a flat grave marker.

With reference to FIGS. 1-12, the container 12, 112, 212, 312 can be made of recycled plastic, can be used to house remains of people or pets, and can be used to house valuables. If someone wanted a secure location to store family heirlooms or other valuables, a hole could be dug in their backyard, and a container 12 could be placed in the hole with a location identifier 36. In the event of a flood, or some other disaster which would cause the remains containers 42 and/or the containers 12 to be moved from their original location, the remains container 42 can be marked with the names of the deceased, and the remains container 42 can be reburied in the proper location with the proper container. The location identifier 36 can also assist with reburial.

Non-limiting aspects have been described, hereinabove. It will be apparent to those skilled in the art that the above methods and apparatuses may incorporate changes and modifications without departing from the general scope of the present subject matter. It is intended to include all such modifications and alterations in so far as they come within the scope of the appended claims or the equivalents thereof.

We claim:

1. A storage apparatus comprising:
   at least one container, wherein the at least one container has a container body, a container body top, a container body bottom, and a cap assembly;
   at least one stake connected to the at least one container, wherein the at least one stake has a stake shaft, a stake head, and a stake tip, wherein the stake head is connected to the container body bottom;
   at least one side stabilizer, wherein the at least one side stabilizer is connected to the outside of the container body; and
   a location identifier, wherein the container is cylindrical or rectangular in shape, wherein the at least one side stabilizer is retractable.

2. The apparatus of claim 1, wherein the location identifier is at least one geolocation device for pinpointing a current location of the at least one container.

3. The apparatus of claim 2, wherein the at least one geolocation device utilizes GPS, wherein the at least one geolocation device is attached to the at least one container body.

4. The apparatus of claim 1, wherein an interment location of the apparatus is stored electronically.

5. The apparatus of claim 1, wherein the apparatus further comprises a marker, wherein the marker contains the name and dates for at least one person or animal interred within the at least one container.

6. The apparatus of claim 5, wherein the information about the at least one person or animal interred within the at least one container is stored electronically in a local physical computing device, a remote physical computing device, or on a virtual cloud computing device.

7. The apparatus of claim 6, wherein the information about the at least one person or animal interred within the at least one container is accessible via a scannable QR code.

8. The apparatus of claim 1, wherein the at least one container is at least two containers, wherein the containers are connected to each other with connectors.

9. The apparatus of claim 1, wherein at least one remains container containing cremated remains of at least one animal or person is adapted to be placed within the at least one container and sealed within the at least one container.

10. The apparatus of claim 1, wherein the apparatus is modular, allowing for multiple remains containers to be interred in the same apparatus.

11. The apparatus of claim 10, wherein the apparatus is openable and resealable, allowing for multiple remains of multiple different people or animals, or personal affects to be interred at different times.

12. The apparatus of claim 1, wherein the apparatus is waterproof.

13. A storage apparatus comprising:
   at least one container, wherein the at least one container has a container body, a container body top, a container body bottom, and a cap assembly;
   at least one stake connected to the at least one container, wherein the at least one stake has a stake shaft, a stake head, and a stake tip, wherein the stake head is connected to the container body bottom;
   at least one side stabilizer, wherein the at least one side stabilizer is connected to the outside of the container body;
   a location identifier;
   an interior base;
   at least one secondary base; and
   a foundation base, wherein the at least one secondary base is on top of the foundation base, and the interior base is on top of the at least one secondary base.

14. A storage apparatus comprising:
   at least one container, wherein the at least one container has a container body, a container body top, a container body bottom, and a cap assembly;
   at least one stake connected to the at least one container, wherein the at least one stake has a stake shaft, a stake head, and a stake tip, wherein the stake head is connected to the container body bottom;
   at least one side stabilizer, wherein the at least one side stabilizer is connected to the outside of the container body;
   a location identifier; and
   at least one ring stabilizer, the ring stabilizer located circumferentially around the container body.

15. A storage apparatus comprising:
   at least one container, wherein the at least one container has a container body, a container body top, a container body bottom, and a cap assembly;
   at least one stake connected to the at least one container, wherein the at least one stake has a stake shaft, a stake head, and a stake tip, wherein the stake head is connected to the container body bottom;
   at least one side stabilizer, wherein the at least one side stabilizer is connected to the outside of the container body; and
   a location identifier, wherein the cap assembly of the at least one container comprises:
      a cap;
      a cap handle;
      cap threads circumferentially inside the cap; and
      an opening through the cap or the cap handle.

16. The apparatus of claim 15, wherein the cap is connected to the cap handle, with the opening in either the cap or the cap handle.

17. The apparatus of claim 16, wherein a chain is connected to the cap or cap handle, traversing the opening, and connected to the remains container with a chain attachment device.

18. An apparatus for burial of cremated remains of one or more persons, animals, or other personal effects, comprising:
   at least one cylindrical or rectangular container, wherein the container has
      a container body,
      a container body top,
      a container body bottom,
      a cushion,
      at least one ring stabilizer, wherein the ring stabilizer is located circumferentially around the container body, and
      a cap assembly, wherein the cap assembly has
         a cap,
         a cap handle,
         cap threads, and
         an opening, wherein the cap is connected to the cap handle, with an opening in either the cap or the cap handle;

at least one remains container containing the cremated remains of the at least one animal or person, wherein the at least one remains container is adapted to be placed within the at least one container and then sealed within the at least one container, wherein a chain is connected to the cap or cap handle, passes through the opening, and is connected to the at least one remains container with a chain attachment device;

at least one stake connected to the at least one container, wherein the at least one stake has a stake shaft, stake head, and a stake tip;

at least one side stabilizer;

at least one geolocation device for pinpointing the current location of the apparatus, making the apparatus retrievable, wherein the at least one geolocation device utilizes GPS, and the at least one geolocation device is attached to the at least one container body, wherein an interment location of the apparatus is stored electronically;

an interior base;

at least one secondary base;

a foundation base, wherein the at least one secondary base is on top of the foundation base, and the interior base is on top of the at least one secondary base;

a marker, wherein the marker contains the name and dates for the at least one person or animal interred within the at least one container, wherein the information about the at least one person or animal interred within the at least one container is accessible via a scannable QR code and the information about the at least one person or animal interred within the at least one container is stored electronically in a local physical computing device, a remote physical computing device, or on a virtual cloud computing device, wherein in the marker is on top of the interior base; and wherein the apparatus is adapted for multiple remains containers to be interred in the same apparatus, wherein the apparatus is openable and resealable, adapted for multiple remains of multiple different people or animals, or personal effects to be interred at different times, and wherein the apparatus is waterproof.

19. A storage apparatus comprising:

at least two containers, wherein the at least two containers each have a container body, a container body top, a container body bottom, and a cap assembly, wherein the containers are connected to each other with connectors;

at least one stake connected to at least one of the at least two containers, wherein the at least one stake has a stake shaft, a stake head, and a stake tip, wherein the stake head is connected to at least one of the container body bottoms; and a location identifier.

* * * * *